US012508394B2

(12) United States Patent
Perera et al.

(10) Patent No.: US 12,508,394 B2
(45) Date of Patent: Dec. 30, 2025

(54) SYSTEMS AND METHODS FOR MINIMIZING COGNITIVE DECLINE USING AUGMENTED REALITY

(71) Applicant: ResMed Pty Ltd, Bella Vista (AU)

(72) Inventors: Bodiyabaduge Dimithri Joseph Perera, Sydney (AU); Lisa Nicole Matthews, Bella Vista (AU); Clare Donker, Sydney (AU); Peter James Dassos, Sydney (AU); Corey Anthony Spink, Sydney (AU); Francis Eric Saunders, San Diego, CA (US)

(73) Assignee: ResMed Pty Ltd, Bella Vista (AU)

( * ) Notice: Subject to any disclaimer, the term of this patent is extended or adjusted under 35 U.S.C. 154(b) by 1012 days.

(21) Appl. No.: 17/614,719

(22) PCT Filed: May 28, 2020

(86) PCT No.: PCT/IB2020/055081
§ 371 (c)(1),
(2) Date: Nov. 29, 2021

(87) PCT Pub. No.: WO2020/240470
PCT Pub. Date: Dec. 3, 2020

(65) Prior Publication Data
US 2022/0226600 A1 Jul. 21, 2022

Related U.S. Application Data

(60) Provisional application No. 62/855,457, filed on May 31, 2019.

(51) Int. Cl.
*A61M 21/00* (2006.01)
*G01C 21/36* (2006.01)
(Continued)

(52) U.S. Cl.
CPC .......... *A61M 21/00* (2013.01); *G01C 21/365* (2013.01); *G02B 27/0172* (2013.01);
(Continued)

(58) Field of Classification Search
CPC .................. A61B 5/168; B60K 2360/177
See application file for complete search history.

(56) References Cited

U.S. PATENT DOCUMENTS 8,831,278 B2  9/2014 Fedorovskaya et al.
9,030,495 B2  5/2015 McCulloch et al.
(Continued)

FOREIGN PATENT DOCUMENTS

JP  2014071756 A  4/2014
JP  6473898 B1  2/2019
(Continued)

OTHER PUBLICATIONS

International Search Report in International Patent Application No. PCT/IB2020/055081 mailed Aug. 4, 2020 (10 pp.).
(Continued)

*Primary Examiner* — Thaddeus B Cox
(74) *Attorney, Agent, or Firm* — Nixon Peabody LLP (57) ABSTRACT

An exemplary device, according to the present disclosure, provides a housing, an AR lens, a projector, a memory, and a control system. The control system and memory determine when the user is confused. The control system then provides for projecting a reorientation graphic via the projector directed at the AR lens. In some implementations, the reorientation graphic provides real time information and reminders to a user as they proceed through life. The exemplary device enables a user to maintain greater independence and a more normal lifestyle with the assistance of the reorientation graphic.

19 Claims, 9 Drawing Sheets

(51) Int. Cl.
*G02B 27/01* (2006.01)
*G06F 3/01* (2006.01)
*G06T 7/20* (2017.01)

(52) U.S. Cl.
CPC ............... *G06F 3/012* (2013.01); *G06T 7/20* (2013.01); *A61M 2021/0027* (2013.01); *A61M 2021/005* (2013.01); *A61M 2209/088* (2013.01); *A61M 2230/06* (2013.01); *A61M 2230/63* (2013.01); *A61M 2230/65* (2013.01); *G02B 2027/0138* (2013.01); *G02B 2027/014* (2013.01); *G02B 2027/0178* (2013.01); *G06F 3/015* (2013.01)

(56) References Cited

U.S. PATENT DOCUMENTS

| | | | |
|---|---|---|---|
| 11,150,437 B1 * | 10/2021 | Ebert | ............... G06F 3/011 |
| 2012/0134543 A1 | 5/2012 | Fedorovskaya | |
| 2013/0009993 A1 | 1/2013 | Horseman | |
| 2013/0188080 A1 * | 7/2013 | Olsson | ............... G06F 1/163 |
| | | | 381/151 |
| 2014/0104059 A1 | 4/2014 | Tran | |
| 2014/0139551 A1 | 5/2014 | Mcculloch et al. | |
| 2015/0253571 A1 * | 9/2015 | Chen | ............... G02B 27/017 |
| | | | 345/8 |
| 2016/0167672 A1 * | 6/2016 | Krueger | ............... G16H 40/63 |
| | | | 340/576 |
| 2017/0323485 A1 | 11/2017 | Samec et al. | |
| 2018/0004286 A1 | 1/2018 | Chen | |
| 2018/0143442 A1 * | 5/2018 | Gupta | ............... A61M 21/00 |

FOREIGN PATENT DOCUMENTS

| | | |
|---|---|---|
| KR | 20180045278 A | 5/2018 |
| KR | 20190041081 A | 4/2019 |
| WO | 2017/004695 A1 | 1/2017 |
| WO | WO-2017036516 A1 * | 3/2017 |

OTHER PUBLICATIONS

Written Opinion in International Patent Application No. PCT/IB2020/055081 mailed Aug. 4, 2020 (6 pp.).

* cited by examiner

SYSTEMS AND METHODS FOR MINIMIZING COGNITIVE DECLINE USING AUGMENTED REALITY

CROSS-REFERENCE TO RELATED APPLICATIONS

This application is a U.S. National Stage of International Application No. PCT/IB2020/055081, filed May 28, 2020, which claims the benefit of and priority to U.S. Provisional Application No. 62/855,457, filed May 31, 2019, which is hereby incorporated by reference herein in its entirety.

TECHNICAL FIELD

The present disclosure relates to cognitive decline, and more specifically, to systems and methods for minimizing the effects of cognitive decline using augmented reality.

BACKGROUND

The aging population is growing more rapidly, and the number of people living with dementia or other states of cognitive decline is increasing. Aging-care facilities are unable to adequately support the population influx. Therefore, family members of elderly patients shoulder much of the responsibility and costs associated with aging. Additionally, healthcare generally is shifting from the hospital to the home across the globe, which increases the burden on family members.

People experiencing various stages of cognitive decline can suffer from many challenges, including inability to remember or connect with loved ones, completion of daily necessities of life (e.g., take medication or navigate their home), and/or travel to a new location. Alzheimer's disease, in particular, currently has no effective diagnosis or therapy, even as an estimated 50 million people suffer from dementia, with worldwide health care costs estimated to be around one trillion US dollars. These costs are expected to increase with the influx of elderly patients. Patients with dementia need to be persistently monitored as no conventional products provide support to the elderly patients. In some situations, the inability of a family member to adequately monitor an elderly patient with dementia or cognitive decline causes patients to live in an aged-care facility earlier than otherwise necessary. This leads to financial stress on their families and the healthcare system.

There are no conventional products that effectively assist caretakers of elderly patients with the broad ranging responsibilities of caring for the elderly patient. Conventional treatment and management options for the effects of aging consist primarily of pharmaceutical solutions. However, conventional drug research has failed to develop an effective and reliable solution for the key symptoms of cognitive decline, which include (1) facial recognition, (2) confusion/getting lost and (3) forgetting a current task. Conventional products fail to provide adequate assistance in a smart, integrated fashion while being financially feasible.

SUMMARY

According to some implementations of the present disclosure, a system is provided to aid a user in overcoming disorientation. The system includes a housing, an AR lens, a projector, a memory, and a control system. The housing is configured to be coupled to a frame, which can be worn on a head of a user. The AR lens and the projector are coupled to the housing. The projector is further configured to emit electromagnetic radiation, which at least partially reflects off the AR lens, and is directed towards an eyeball of the user. This electromagnetic radiation is visible to the user as an augmented reality reorientation graphic. The memory stores machine-readable instructions. The control system includes one or more processors configured to execute the machine-readable instructions and perform a series of steps. The steps include determining a user confusion index. The steps then provide for causing the projector to emit the electromagnetic radiation such that the augmented reality reorientation graphic is visible to the user when the determined user confusion index satisfies a predetermined threshold.

According to some implementations of the present disclosure, a system is provided to aid a user in overcoming disorientation. The system includes a housing, a camera, an AR lens, a projector, a memory, and a control system. The housing is configured to be coupled to a frame, which supports a corrective lens. When worn on the head of a user, the frame positions the corrective lens adjacent to an eyeball of a user. The camera is coupled to the housing and generates image data. The image data is reproducible as one or more images generally corresponding to a field of view of the user. The AR lens is coupled to the housing, and is adjacent to an outside surface of the corrective lens when the housing is coupled to the frame. The projector is further configured to emit electromagnetic radiation, which at least partially reflects off the AR lens, through the corrective lens, and is directed towards an eyeball of the user. This electromagnetic radiation is visible to the user as an augmented reality reorientation graphic. The memory stores machine-readable instructions. The control system includes one or more processors configured to execute the machine-readable instructions and perform a series of steps. The steps include estimating a movement component of the head of the user based at least in part on the generated image data. The steps then provide for generating a user confusion index based at least in part on the estimated movement component. The steps then provide for causing the projector to emit the electromagnetic radiation such that the augmented reality reorientation graphic is visible to the user when the determined user confusion index satisfies a predetermined threshold.

According to some implementations of the present disclosure, a system is provided to aid a user in overcoming disorientation. The system includes a housing, a camera, a microphone, an AR lens, a projector, a speaker, a memory, and a control system. The housing is configured to be coupled to a frame, which can be worn on a head of a user. The camera is coupled to the housing and generates image data. The image data is reproducible as one or more images generally corresponding to a field of view of the user. The microphone is coupled to the housing, and generates sound data that is reproducible as audio clips. The AR lens and the projector are coupled to the housing. The projector is further configured to emit electromagnetic radiation, which at least partially reflects off the AR lens, and is directed towards an eyeball of the user. This electromagnetic radiation is visible to the user as an augmented reality reorientation graphic. The speaker is coupled to the housing and emits sound that is audible to the user as a reorientation audio clip. The memory stores machine-readable instructions. The control system includes one or more processors configured to execute the machine-readable instructions and perform a series of steps. The steps provide for generating a reorientation scheme, which includes the augmented reality reorientation graphic and the reorientation audio clip. The steps then provide for determining a user confusion index. The steps then provide for presenting the reorientation scheme to the user when the determined user confusion index satisfies a predetermined threshold.

According to some implementations of the present disclosure, a system is provided to aid a user in overcoming disorientation. The system includes a housing, a camera, an AR lens, a projector, a memory, and a control system. The housing is configured to be coupled to a frame, which can be worn on a head of a user. The camera is coupled to the housing and generates image data. The image data is reproducible as one or more images generally corresponding to a field of view of the user. The AR lens and the projector are coupled to the housing. The projector is further configured to emit electromagnetic radiation, which at least partially reflects off the AR lens, and is directed towards an eyeball of the user. The memory stores machine-readable instructions. The control system includes one or more processors configured to execute the machine-readable instructions and perform a series of steps. The steps provide for determining a user confusion index. The steps then provide for causing the projector to emit the electromagnetic radiation such that an interactive augmented reality game is visible to the user when the determined user confusion index satisfies a predetermined threshold.

The foregoing and additional aspects and implementations of the present disclosure will be apparent to those of ordinary skill in the art in view of the detailed description of various embodiments and/or implementations, which is made with reference to the drawings, a brief description of which is provided next.

BRIEF DESCRIPTION OF THE DRAWINGS

The foregoing and other advantages of the present disclosure will become apparent upon reading the following detailed description and upon reference to the drawings.

DETAILED DESCRIPTION

The present disclosure addresses the challenges of caring for elderly patients and/or persons with cognitive decline by providing systems and methods to reorient users during periods of confusion. An exemplary device, according to the present disclosure, provides a housing, an AR lens, a projector, a memory, and a control system. The control system and memory determine when the user is confused. The control system then provides for projecting a reorientation graphic via the projector directed at the AR lens. In some implementations, the reorientation graphic provides real time information and reminders to a user as they proceed through life. In some implementations, the reorientation graphic includes information such as the name of a person and their relationship to the user as a person comes into view. In other examples, the reorientation graphic includes information designed to encourage a particular emotion in the user (e.g., calming images or familiar faces to calm a user).

Therefore, the present disclosure enables a user to maintain greater independence and a more normal lifestyle with the assistance of one or more reorientation graphics and/or schemes. An exemplary device of the present disclosure further provides for detecting anxiety and confusion, learning a user's routine, having continuous access to a protection system, providing alerts, notifying external people of the user's need for assistance, and tracking a user's movements, among other features discussed further herein.

Figure 1:
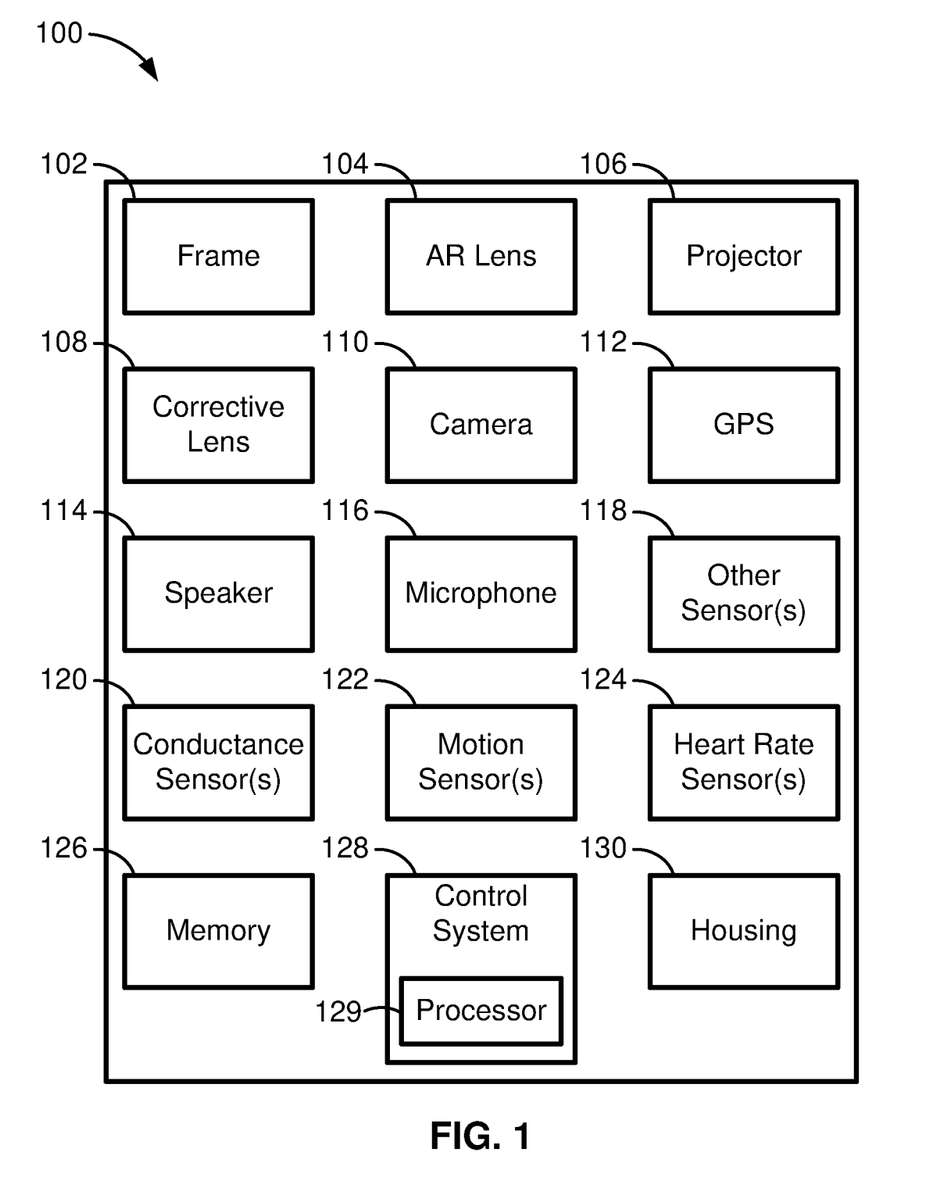
FIG. 1 is a diagram of a system capable of aiding a user in overcoming disorientation, according to some implementations of the present disclosure.

Referring to FIG. 1, a system 100, capable of aiding a user in overcoming disorientation, includes a frame 102, an augmented reality (AR) lens 104, a projector 106, a corrective lens 108, a camera 110, a global positioning system (GPS) sensor 112, a speaker 114, a microphone 116, at least one other sensor 118, a conductance sensor 120, a motion sensor 122, a heart rate sensor 124, a memory 126, a control system 128, a housing 130, or any combination thereof.

The frame 102 is a structural element designed to secure the system 100 to a user. In some implementations, the frame 102 is an eyepiece frame (e.g., a glasses frame), a watch strap/band, a head gear/strap, etc. or any other element that can be used to secure one or more objects to a user. In some implementations, the frame 102 is coupled to a housing 130. The housing 130 mechanically couples to the frame 102 through connecting elements (for example, as discussed further with respect to FIG. 2B). In some implementations, the AR lens 104, the projector 106, the corrective lens 108, the camera 110, the global positioning system (GPS) sensor 112, the speaker 114, the microphone 116, the at least one other sensor 118, the conductance sensor 120, the motion sensor 122, the heart rate sensor 124, the memory 126, and the control system 128 are located on and/or in or otherwise coupled to the housing 130. In some other implementations, any combination of these elements is located on and/or in or otherwise coupled to the frame 102 directly and/or indirectly. In some implementations of system 100, there may be more than one of any of the following sensors: the at least one other sensor 118, the conductance sensor 120, the motion sensor 122, and the heart rate sensor 124. In some implementations the housing 130 is readily removably coupled to the frame 102. In other examples, the housing 130 is not readily removably coupled (e.g., permanently coupled) to the frame 102 such that, for example, removal of the housing 130 requires a breaking of the frame 102 and/or the housing 130.

The AR lens 104 is or includes a prism. In some implementations, the AR lens 104 is positioned so as to direct electromagnetic radiation from the projector 106 towards the corrective lens 108. In some implementations, the AR lens 104 transmits electromagnetic radiation through the corrective lens 108 away from a user; in other examples, the AR lens 104 transmits electromagnetic radiation off of the corrective lens 108 and towards the user (e.g., towards an eyeball of the user).

The corrective lens 108 is coupled to the frame 102 and configured to be positioned in front of the eye/eyeball of a user. In some implementations, the corrective lens 108 provides visual assistance to the user; in other examples, the corrective lens 108 is a plano lens with a power of zero.

The control system 128 can be communicatively coupled to the projector 106, the camera 110, the GPS sensor 112, the speaker 114, the microphone 116, the at least one other sensor 118, the conductance sensor 120, the motion sensor 122, the heart rate sensor 124, the memory or memory device 126 or any combination thereof. The control system 128 is configured to instruct these various elements to collect data, according to their various characteristics. The control system 128 can further provide for storing the collected data in the memory 126 and/or transmitting the collected data to an external computing device (for example, as discussed further with respect to FIGS. 3 and 4). In some implementations, the at least one other sensor 118 is a GPS sensor configured to locate system 100 (and thereby, locate a user associated with system 100). In other examples, the at least one sensor 118 is a depth sensor configured to measure a distance of an object, in the field of view of the user, from the housing 130.

The control system 128 includes one or more processors 129. The control system 128 is generally used to control (e.g., actuate) the various components of the system 100 and/or analyze data obtained and/or generated by the components of the system 100. The processor 128 can be a general or special purpose processor or microprocessor. While one processor 129 is shown in FIG. 1, the control system 128 can include any suitable number of processors (e.g., one processor, two processors, five processors, ten processors, etc.) that can be in a single housing, or located remotely from each other. The control system 128 can be coupled to and/or positioned within, for example, the housing 130 or the frame 102. The control system 128 can be centralized (within one such housing) or decentralized (within two or more of such housings, which are physically distinct). In such implementations including two or more housings containing the control system 128, such housings can be located proximately and/or remotely from each other.

The memory 126 stores machine-readable instructions that are executable by the processor 129 of the control system 128. The memory 126 can be any suitable computer readable storage device or media, such as, for example, a random or serial access memory device, a hard drive, a solid state drive, a flash memory device, etc. While one memory 126 is shown in FIG. 1, the system 100 can include any suitable number of memory devices (e.g., one memory device, two memory devices, five memory devices, ten memory devices, etc.). The memory 126 can be coupled to and/or positioned within the frame 102 or the housing 130. Like the control system 128, the memory 126 can be centralized (within one such housing) or decentralized (within two or more of such housings, which are physically distinct).

In some implementations, the memory 126 (FIG. 1) stores a user profile associated with the user. The user profile can include, for example, demographic information associated with the user, biometric information associated with the user, medical information associated with the user, self-reported user feedback, sleep parameters associated with the user (e.g., sleep-related parameters recorded from one or more earlier sleep sessions), or any combination thereof. The demographic information can include, for example, information indicative of an age of the user, a gender of the user, a race of the user, a family history of insomnia, an employment status of the user, an educational status of the user, a socioeconomic status of the user, or any combination thereof. The medical information can include, for example, including indicative of one or more medical conditions associated with the user, medication usage by the user, or both. The medical information data can further include a multiple sleep latency test (MSLT) test result or score and/or a Pittsburgh Sleep Quality Index (PSQI) score or value. The self-reported user feedback can include information indicative of a self-reported subjective sleep score (e.g., poor, average, excellent), a self-reported subjective stress level of the user, a self-reported subjective fatigue level of the user, a self-reported subjective health status of the user, a recent life event experienced by the user, or any combination thereof.

The projector 106 is configured to emit electromagnetic radiation in response to instructions from the control system 128. The projector 106 is configured to emit electromagnetic radiation that presents to the user as a graphic, which can be text, an image, a game, or any other visual display. In some implementations, the projector 106 sends electromagnetic radiation directly towards the retina of a user. In some implementations, the projector 106 is and/or includes a low-intensity laser configured to emit visible light.

The camera 110 is configured to record one or more images and/or video data, including, for example, one or more video clips. In some implementations, the camera 110 is positioned on the frame 102 to be substantially aligned with an optical axis of the corrective lens 108. The microphone 116 is configured to record audio data. The control system 128 provides for starting and stopping recording of the camera 110 and/or the microphone 116. The speaker 114 is configured to emit audio data in response to instructions from the control system 128. In some implementations, the speaker 114 and the microphone 116 operate in tandem to provide an auditory interface for a user. Such an auditory interface can receive audio from a user via the microphone 116, process the audio data at the control system 128, determine an auditory response based on the audio data, and provide the auditory response via the speaker 114.

The system 100 further includes a plurality of sensors configured to collect data associated with a user of the system 100. Although particular sensors are shown in FIG. 1, any biometric sensors can be included in the system 100 (for example, the other sensor(s) 118). In particular, the system 100 can include the conductance sensor 120, which is configured to measure electrodermal activity of a user.

The system 100 can further include the motion sensor 122, configured to measure motion of system 100. When the system 100 is mounted on the head of a user, the motion sensor 122 generates motion data related to movement of the head of the user. For example, the control system 128 determines when a user falls, based on data from the motion sensor 122. In some implementations, the motion sensor 122 is an accelerometer or a gyroscope.

The system 100 can additionally include the heart rate sensor 124, configured to measure the heart rate of a user and generate heart rate data. In some implementations, the heart rate data indicates (1) a heart rate of the user, (2) a variability of the heart rate of a user between breathing in and breathing out, or (3) both the heart rate and the variability of the heart rate while breathing.

Therefore, the sensors (e.g., the other sensor(s) 118, the conductance sensor 120, the motion sensor 122, and the heart rate sensor 124) provide data that can be analyzed to provide indicators of a patient's vitals (including, heart-rate, respiration, and body movements), location, and/or stress levels. In some implementations, the data collected by the sensors 118, 120, 122, and 124 provide detection and/or monitoring of user confusion and/or panic. Therefore, the system 100 is able to provide real-time monitoring of a user, and, in some implementations, provides predictions of confusion episodes.

In some implementations, the system 100 is and/or includes a watch, a pair of glasses, a smart phone, and/or is embedded into an article of clothing of a user (e.g., a headband, a hat, a shirt, pants, shorts, etc., or any combination thereof). Therefore, the system 100 is capable of collecting user data and providing instructions to the projector 106 based on the data collected. Additional system examples and methods of providing instructions to the projector are discussed further herein.

Figure 2A:
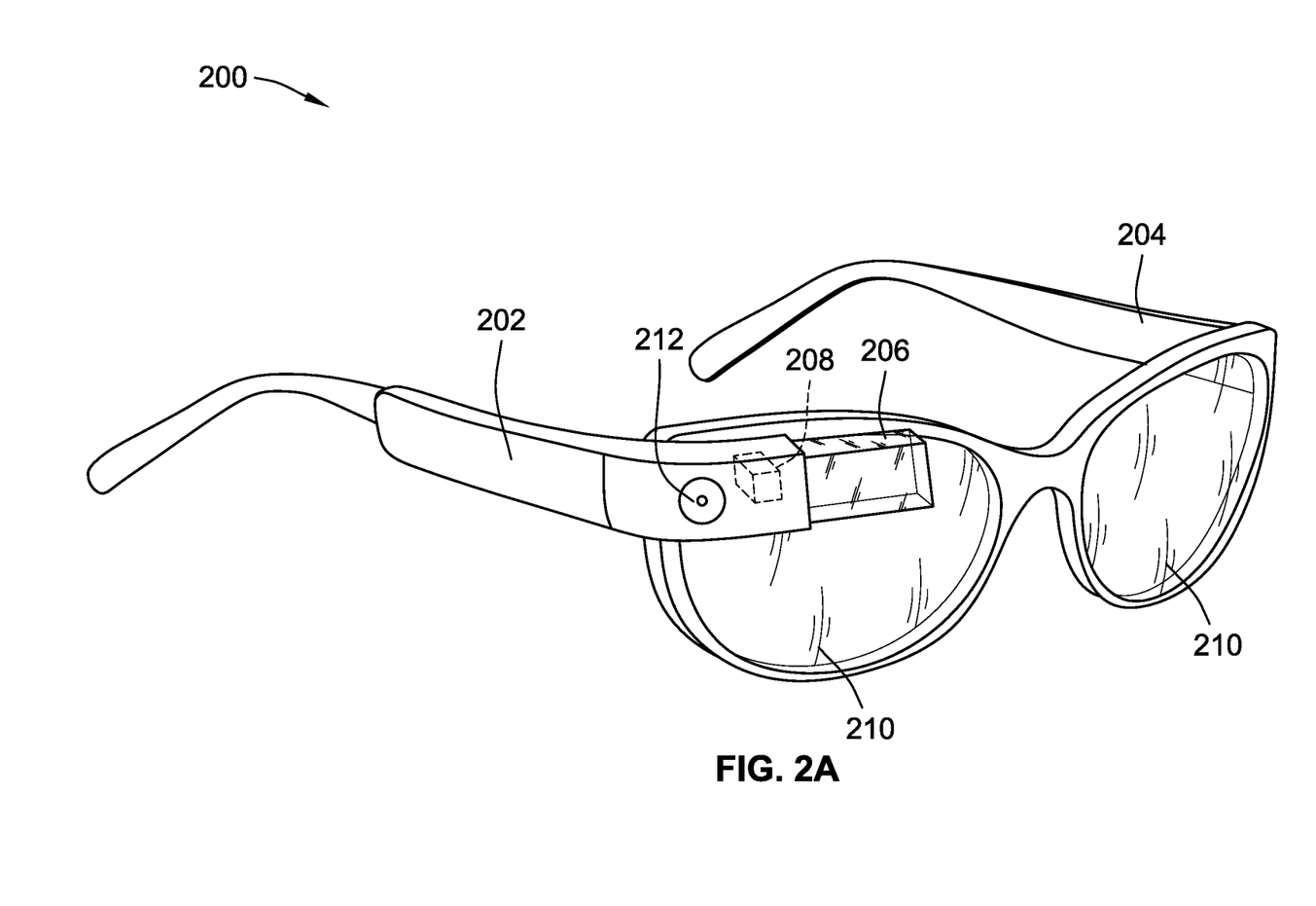
FIG. 2A is a perspective view of a device capable of aiding a user in overcoming disorientation, according to some implementations of the present disclosure.
Figure 2B:
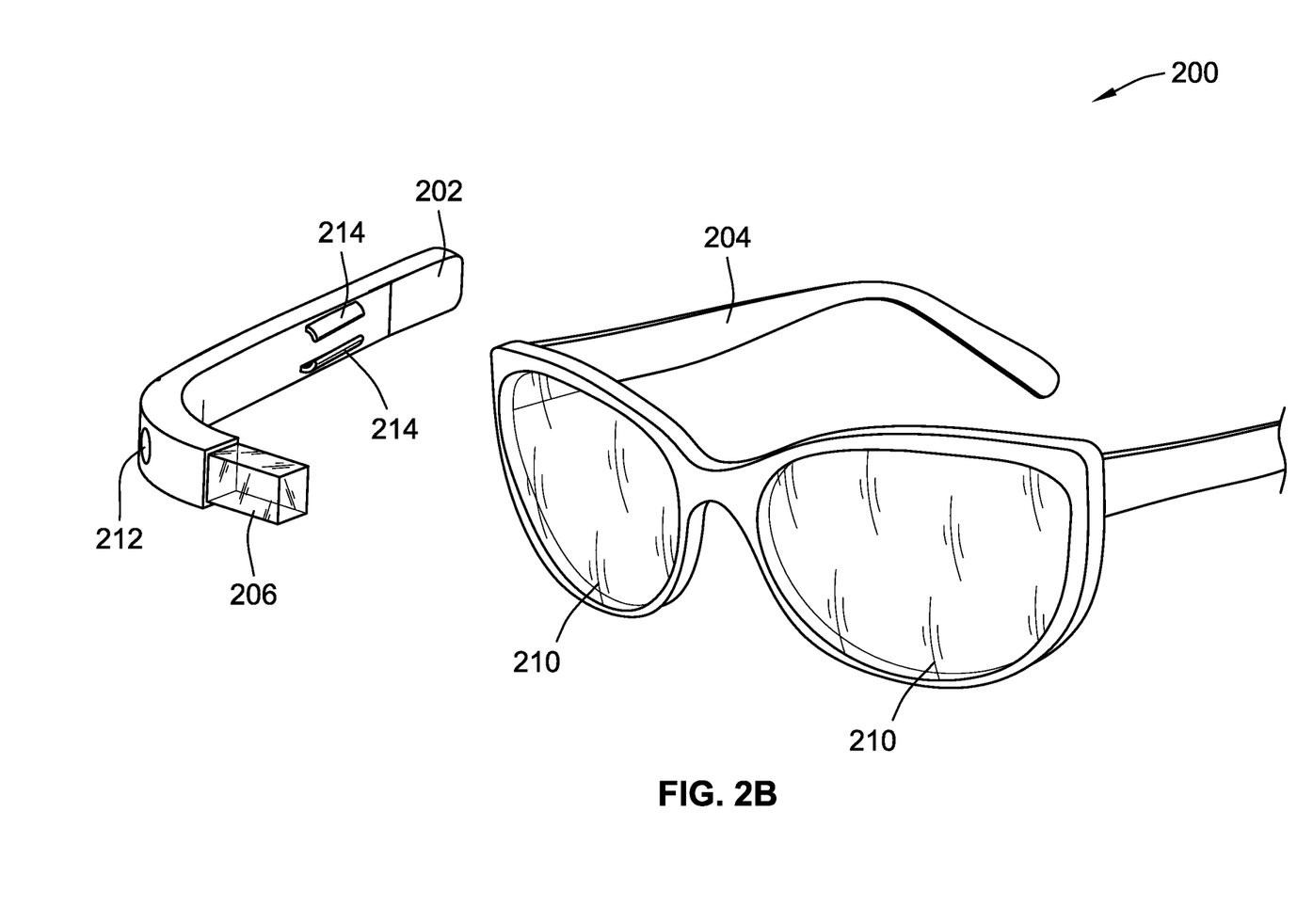
FIG. 2B is an exploded view of the device of FIG. 2A.

Referring generally to FIGS. 2A and 2B, a device 200 capable of aiding a user in overcoming disorientation includes a housing 202, a frame 204, an AR lens 206, a projector 208, a pair of corrective lenses 210, and a camera 212. In some implementations, elements of device 200 correspond to elements of system 100, and are provided for as described above with respect to FIG. 1. For example, the housing 202 is the same as, or similar to, the housing 130 of FIG. 1; the frame 204 is the same as, or similar to, the frame 102 of FIG. 1; the AR lens 206 is the same as, or similar to, the AR lens 104 of FIG. 1; the projector 208 is the same as, or similar to, the projector 106 of FIG. 1; the corrective lenses 210 is the same as, or similar to, the corrective lens 108 of FIG. 1; and the camera 212 is the same as, or similar to, the camera 110 of FIG. 1.

The projector 208 is a low-intensity laser that is positioned on an inside portion of the housing 202. The projector 208 is able to project light that reflects off of the AR lens 206 in a manner that is visible to a user of the device 200 as, for example, one or more reorientation graphics. In some implementations, the AR lens 206 projects the light through the corrective lens 210 into the eye of the user of the device 200. In other implementations, the AR lens 206 projects the light outwards away from the user, and the user looks through the corrective lens 210 to see the projected light.

The corrective lenses 210 can provide visual assistance to a user of the device 200. In some implementations, the corrective lenses are plano lenses with a power of zero. In some other implementations, the corrective lenses 210 are prescription corrective lenses with a non-zero power.

Referring to FIG. 2B, the device 200 includes connector elements 214. The connector elements 214 can include any mechanical connectors configured to removably couple the housing 202 and the frame 204. As shown in FIG. 2B, the connector elements 214 are flexible clipping elements configured to receive a portion of the frame 204 therein to removably hold the housing 202 to the frame 204. In other implementations, the connector elements 214 can include hook and loop fasteners, snaps, male and female connectors, magnets, adhesive elements, or any other mechanical connector, or any combination thereof. The connector elements 214 allow the housing 202 to removably couple with the frame 204 without the use of external tools. In some implementations, the connector elements 214 are adjustable, so as to receive different sizes and/or styles of frames 204 therein. It is understood that the housing 202 (and the elements coupled thereto) integrate with a pair of glasses of the user and does not require a specially-manufactured pair of AR glasses.

In some implementations, the projector 208 is configured to calibrate the electromagnetic radiation based on a position of the housing 202 from the corrective lens 210 and/or a position of the housing 202 along the frame 204. For example, the projector 208 projects electromagnetic radiation, and the camera 212 detects when the electromagnetic radiation is visible to a user of the system. The projector 208 and the camera 212 can be communicatively coupled to an external and/or internal computing device which determines a position of the housing 202 based on a time between the projector 208 protecting the electromagnetic radiation and the camera 212 detecting the electromagnetic radiation. In some implementations, the device 200 further includes a depth sensor configured to measure a distance between the depth sensor and the corrective lens 210. The depth sensor can be positioned along a front edge of the housing 202 to face the corrective lens 210.

Figure 3:
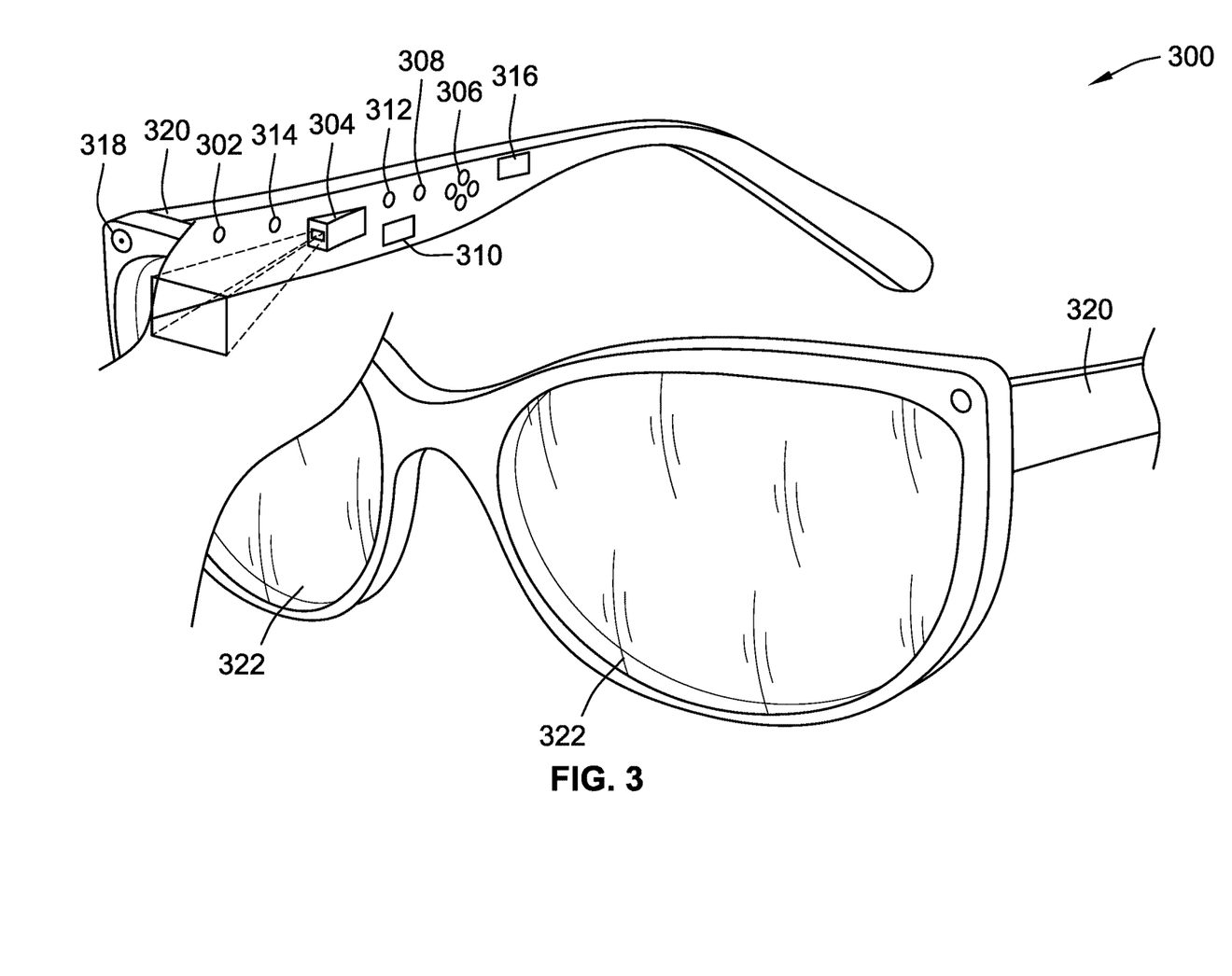
FIG. 3 is a partial perspective view of an integrated device capable of aiding a user in overcoming disorientation, according to some implementations of the present disclosure.

Referring to FIG. 3, an integrated device 300 includes a microphone 302, a projector 304, a speaker 306, a heart rate sensor 308, a connectivity element 310, a GPS sensor 312, an accelerometer 314, a skin conductance sensor 316, a camera 318, a frame 320, and corrective lenses 322. In some implementations, elements of device 300 correspond to elements of system 100, and are provided for as described above with respect to FIG. 1. For example, the microphone 302 is the same as, or similar to, the microphone 116 of FIG. 1; the projector 304 is the same as, or similar to, the projector 106 of FIG. 1; the speaker 306 is the same as, or similar to, the speaker 114 of FIG. 1; the heart rate sensor 308 is the same as, or similar to, the heart rate sensor 124 of FIG. 1; the GPS sensor 312 is the same as, or similar to, the GPS sensor 112 of FIG. 1; the accelerometer 314 is the same as, or similar to, the motion sensor 122 of FIG. 1; the camera 318 is the same as, or similar to, the camera 110 of FIG. 1; the frame 320 is the same as, or similar to, the frame 102 of FIG. 1; and the corrective lenses 322 is the same as, or similar to, the corrective lens 108 of FIG. 1.

The elements of the integrated device 300 are permanently integrated into the frame 320. Therefore, the device 300 is a unified device with ease of use, which does not require the user to connect a separate device (e.g., the device 200) to a separate frame (e.g., the frame 204) before operation of the device 300.

The connectivity element 310 is any wireless connection communication module. In some implementations, the connectivity element 310 communicates via Wi-Fi, Bluetooth, radio frequency, or any other wireless connection. In some implementations, the connectivity element 310 is a port for wired communication. In some implementations, the connectivity element 310 is directly coupled to the microphone 302, the projector 304, the speaker 306, the heart rate sensor 308, the GPS sensor 312, the accelerometer 314, the skin conductance sensor 316, or any combination thereof. The connectivity element 310 is able to transmit data collected by the elements of the integrated device 300 directly and/or indirectly to an external computing device (not shown). In some implementations, the connectivity element 310 further transmits instructions to the elements of the integrated device 300 from an external computing device (not shown).

The integrated device 300 includes a memory and a control system, which are the same as, or similar to, the memory 126 and the control system 128 described above in connection with FIG. 1. The memory and the control system of the integrated device 300 are able to transmit data collected from the microphone 302, the heart rate sensor 308, the GPS sensor 312, the accelerometer 314, the skin conductance sensor 316, and the camera 318 via the connectivity element 310 to an external computing device. In some implementations, the connectivity element 310 can transmit instructions from the external computing device to the microphone 302, the heart rate sensor 308, the GPS sensor 312, the accelerometer 314, the skin conductance sensor 316, the camera 318, or any combination thereof.

Figure 4:
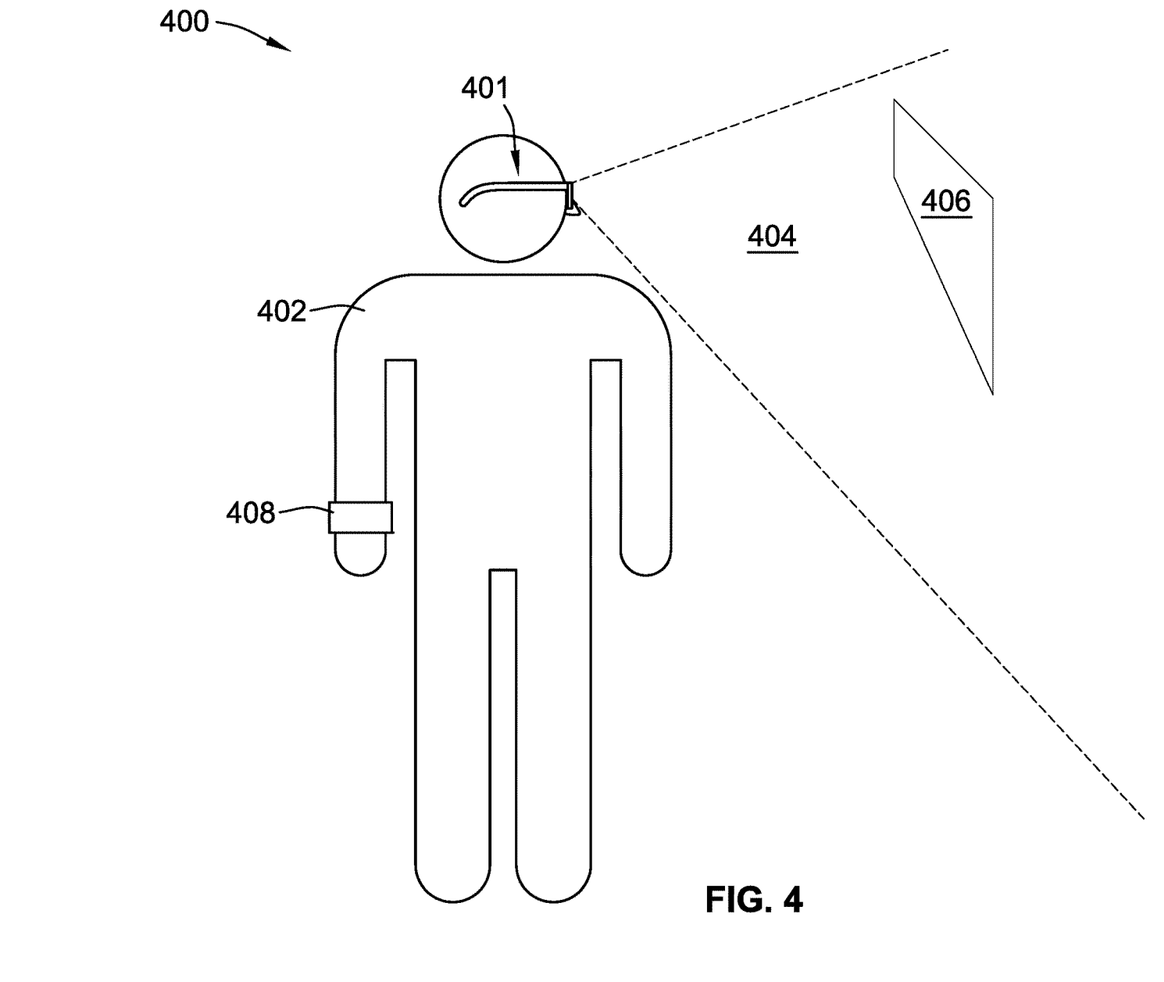
FIG. 4 is a diagram that illustrates a system capable of aiding a user in overcoming disorientation, according to some implementations of the present disclosure.

Referring to FIG. 4, a system 400 capable of aiding a user in overcoming disorientation includes a reorientation device 401 and a sensor 408. The reorientation device 401 is the same as, or similar to, system 100 of FIG. 1, device 200 of FIGS. 2A-2B, device 300 of FIG. 3, or any combination thereof. The reorientation device 401 is able to be worn on a head of the user 402 and project a graphic 406 into the user's field of view 404.

Therefore, the reorientation device 401 affects a field of view 404 of a user 402 with some type of graphic 406. In some implementations, the graphic 406 is an image, a text, a picture of a person, an itinerary, a to-do list, a reminder, an alert. In some implementations, the AF graphic 406 is provided in response to data collected by the reorientation device 401. For example, if the reorientation device 401 determines that the user 402 is confused, the AR graphic 406 is provided to reorient the user 402. If the reorientation device 401 determines that the user 402 is anxious, the AR graphic 406 is provided to calm the user 402. Examples of the AR graphic 406 are discussed further below with respect to FIGS. 5A-5C.

Additionally, the system 400 includes the sensor 408, which is external to the reorientation device 401. In some implementations, the sensor 408 is communicatively coupled to the reorientation device 401. The sensor 408 collects biometric data from the user 402, including any of: heart rate data, motion data, electrodermal activity, or any other biometric data. Although sensor 408 is shown in FIG. 4 on a user's arm, sensor 408 can be located anywhere on user 402. In some implementations, sensor 408 is a smart phone, a smart watch, a wearable computing device, a fitness band, any other wearable item configured to collect biometric data of a user 402, and any combination thereof. The reorientation device 401 is able to determine the graphic 406 based on data provided by sensor 408.

Figure 5A:
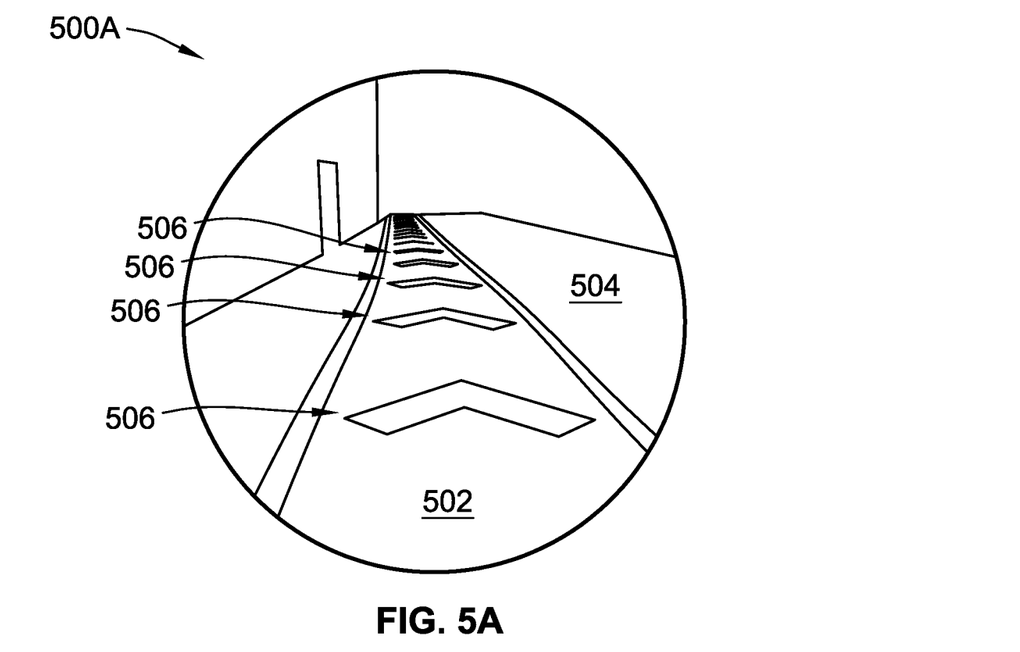
FIG. 5A is an illustration of an exemplary reorientation graphic, according to some implementations of the present disclosure.

Referring to FIG. 5A, an exemplary reorientation graphic (e.g., graphic 406 of FIG. 4) in a user's field of view 500A is shown. The user's field of view 500A includes a virtually illustrated pathway 502, a real surrounding area 504 (as opposed to a virtually illustrated surrounding area), and a plurality of virtually generated arrows 506. The virtually illustrated pathway 502 is overlaid on a walkable area within the field of view 500A. In some implementations, the virtually illustrated pathway 502 is overlaid on a drivable area. The virtually illustrated pathway 502 further includes a plurality of arrows 506 designed to direct a user in a particular direction. In some implementations, the arrows 506 and the pathway 502 direct a user in a path predetermined by an external computing system (or, for example, the control system 128 of FIG. 1). For example, the predetermined path can include indoor navigation through a user's home or outdoor navigation to a selected location.

Figure 5B:
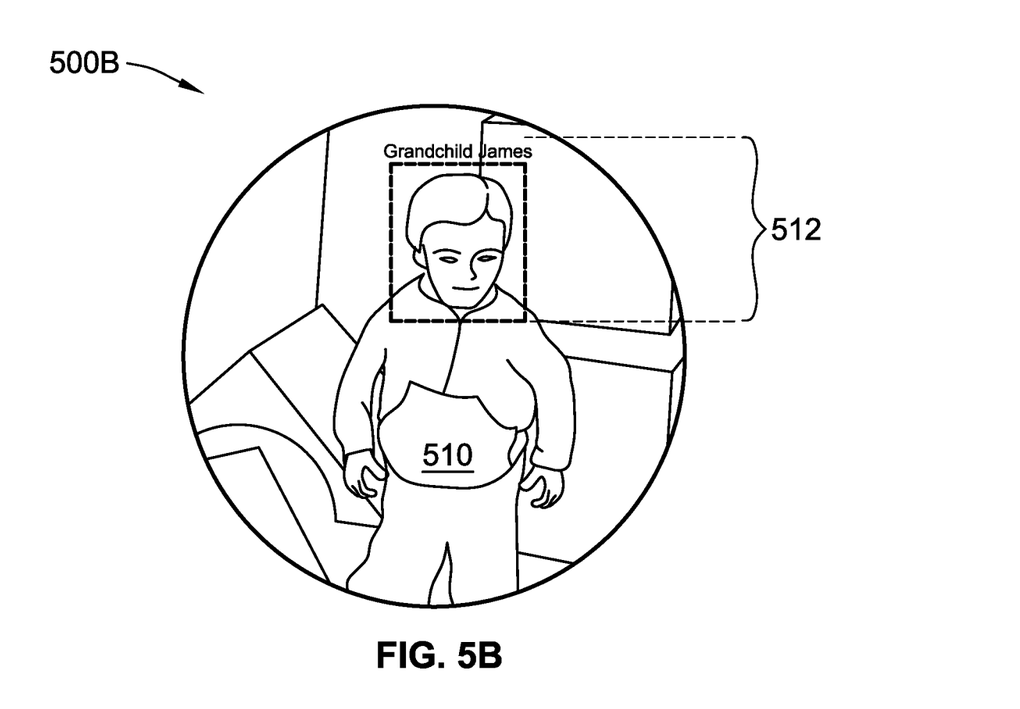
FIG. 5B is an illustration of an exemplary reorientation graphic, according to some implementations of the present disclosure.

Referring to FIG. 5B, an exemplary reorientation graphic (e.g., graphic 406 of FIG. 4) in a user's field of view 500B is shown. The user's field of view 500B includes a real person 510 and a virtually generated identification tag 512. The virtually generated identification tag 512 is overlaid on a real person 510. For example, a reorientation system or device (e.g., device 401 of FIG. 4) can be configured to recognize when a real person 510, who is known by the user, enters the user's field of view 500B. The reorientation system or device can be configured to label the real person 510 with a virtually generated identification tag 512. In some implementations, the virtually generated identification tag 512 is a box or circle around the person's face 510, or an arrow pointing towards a face of the real person 510. In some implementations, the virtually generated identification tag 512 includes information about the real person 510, such as a name, age, occupation, relation to the user, other relevant characteristics, and any combination thereof.

Figure 5C:
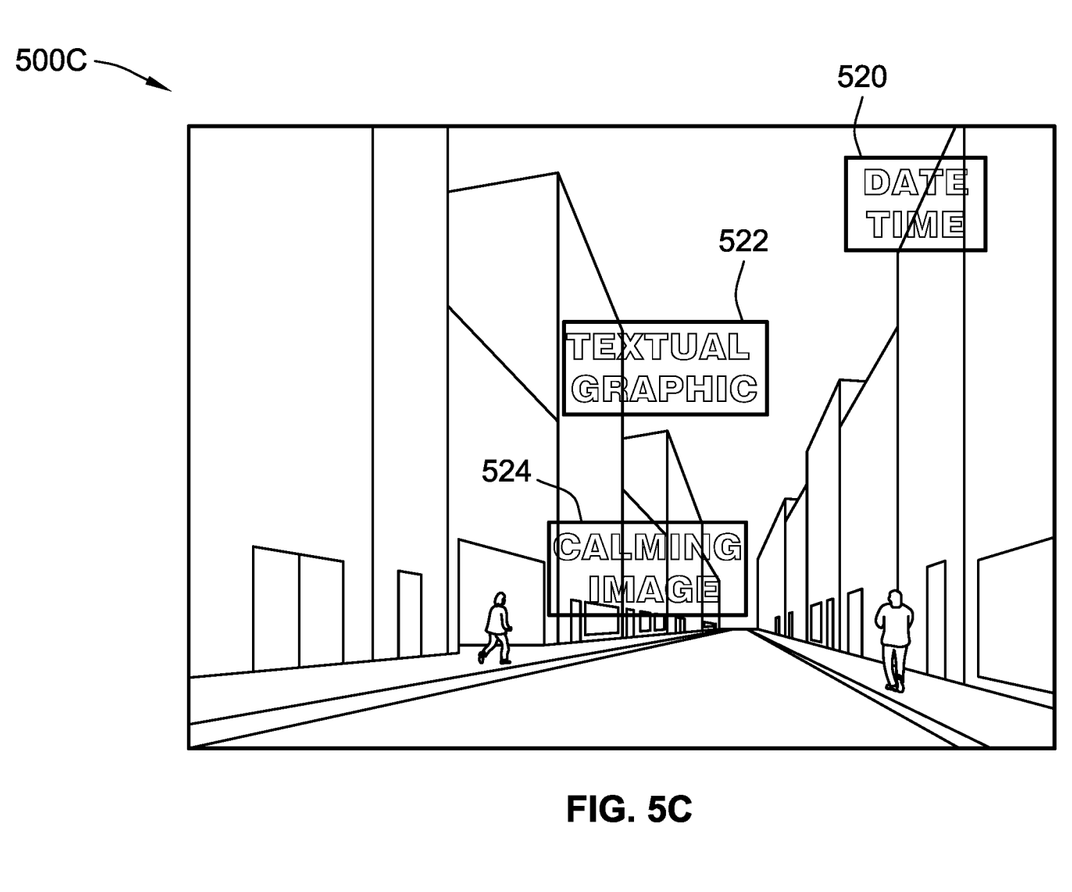
FIG. 5C is an illustration of an exemplary reorientation graphic, according to some implementations of the present disclosure.

Referring to FIG. 5C, an exemplary reorientation graphic (e.g., graphic 406 of FIG. 4) in a person's field of view 500C is shown. The user's field of view 500C includes a virtually generated date and time 520, a virtually generated textual graphic 522, and a virtually generated calming image 524. In some implementations, multiple virtually generated graphics (e.g. date and time 520, textual graphic 522, and calming image 524) are overlaid in a field of view over a real surrounding area. The virtually generated textual graphic 522 includes any of: a task, details on a present task, a reminder, a shopping list, a calendar event, and a medication alert. The virtually generated calming image 524 includes, for example, any of: a picture of a person known to the user, a selected image pre-determined by the user.

Although particular aspects of possible AR graphics are shown in FIGS. 5A-5C, the present disclosure contemplates that an exemplary AR graphic can have any number of additional features. For example, the AR graphic can be any text-based information, visual image, video clip, or media clip. Additionally, FIGS. 5A-5C demonstrate that the AR graphic can be based on images in the field of view of the user, or images that generally correspond to the field of view of the user.

In some implementations, the AR graphic includes (i) text based information that is indicative of a current mission of the user, (ii) text based information that is indicative of a reminder for the user to take a specific medication at a specific time, (iii) augmented reality directions, (iv) a current day of week, a current year, a current time of day, a current season, or any combination thereof, (v) current event information, (vi) a representation of a portion of a newspaper previously viewed by the user, (vii) social media news feed information previously viewed by the user, (viii) a representation of a portion of a website previously viewed by the user, (ix) information identifying a human in the field of view of the user by name, (x) identity information associated with the user, the identity information including a name of the user, a home address of the user, a name of a user's spouse, or any combination thereof, (xi) or any combination of (i)-(x).

Figure 6:
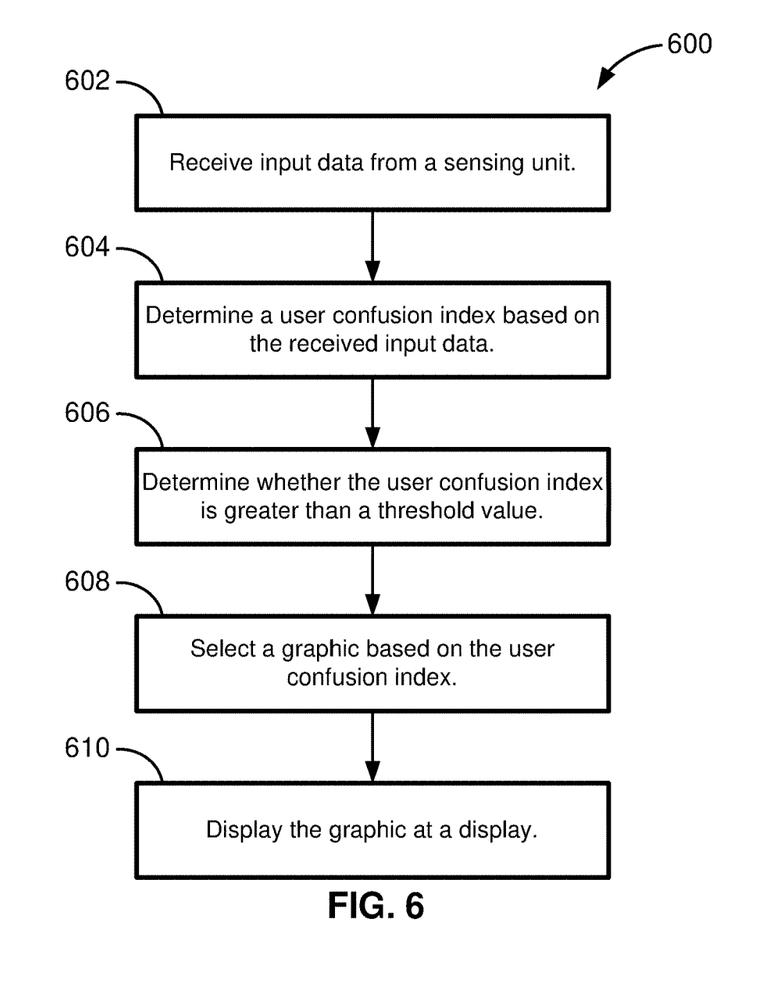
FIG. 6 is a flowchart of a process for displaying a reorientation graphic, according to some implementations of the present disclosure.

Referring to FIG. 6, a method 600 for displaying a reorientation graphic is illustrated according to some implementations of the present disclosure. The method 600 can be is performed using the system 100 of FIG. 1, the device 200 of FIGS. 2A-2B, and/or the integrated device 300 of FIG. 3.

The method 600 begins by receiving input data from a sensing unit 602. For example, the sensing unit is one of the elements of system 100 (e.g., camera 110, global positioning system (GPS) sensor 112, speaker 114, microphone 116, sensor 118, conductance sensor 120, motion sensor 122, and/or heart rate sensor 124). In some implementations, the sensing unit is sensor 408 of FIG. 4. The input data is any biometric data of a user, as known in the art. In some implementations, the input data further includes audio or visual data (collected respectively, for example, by camera 110 and microphone 116 of FIG. 1).

The method 600 then provides for determining a user confusion index based on the received input data 604. In some implementations, the user confusion index is a numerical score (for example, a score out of 10, 100, or any other range). In some implementations, the user confusion index is determined based on a machine learning algorithm which is trained on input data similar to the data provided by the sensing unit. In some implementations, the user confusion index is a binary value indicating either (1) the user is confused, or (2) the user is not confused. In some implementations, method 600 further provides for determining what a user is confused about (e.g., is the user confused while walking, is the user confused while talking to another person, is the user confused after taking a phone call).

In some implementations, the user confusion index is based on (i) image data received from a camera, (ii) the motion data received from a motion sensor, (iii) heart rate data received from a heart rate sensor, (iv) skin conductance data received from a conductance sensor, or (v) any combination of (i)-(iv).

The method 600 then provides for determining whether the user confusion index is greater than a threshold value 606. In some implementations, the threshold value is a predetermined numerical score which indicates an elevated level of confusion, panic, anxiety, or distress of an associated user.

The method 600 then provides for selecting a graphic based on the user confusion index 608. In some implementations, the graphic is based on the severity of a user's confusion. In some implementations, 608 further provides for selecting a graphic based on both the user confusion and the input data from the sensing unit (i.e., as collected in 602, as discussed above). In some implementations, the graphic is selected based on a machine learning algorithm which analyzes the input data and determines a graphic or a graphic type which is predicted to lower the user's confusion index. For example, if the user is confused while walking, the selected graphic is a map or a pathway (e.g., as shown in FIG. 5A). In some implementations, the selected graphic is a series of graphics (e.g., as shown in FIG. 5C). In some implementations, if the user is confused while talking to a person, the selected graphic is an identification tag (e.g., as shown in FIG. 5B).

The method 600 then provides for displaying the graphic at a device 610. In some implementations, the graphic is projected from a projector onto an AR lens and/or a corrective lens. In some implementations of 610, the graphic is displayed both at a device 401, as discussed with respect to FIG. 4, and at a separate external device, for example, a mobile phone. In some implementations, the graphic is stored in the memory of the separate external device. The graphic can be any graphic, as discussed above with respect to FIGS. 5A-5C.

In some implementations, 610 further provides a reorientation audio message at a speaker on a device (e.g., speaker 114 of FIG. 1). In some implementations, the reorientation audio message is in conjunction with the graphic displayed on the device, and is displayed in response to the user confusion index surpassing a threshold value. The reorientation audio message can correspond to the displayed graphic; in some implementations, the reorientation audio message reads aloud text-based information included in the displayed graphic.

Therefore, the method 600 provides detection and prediction of a user's panic and confusion. In some implementations, the method 600 further provides a notice to a caretaker or family member of the user's confusion index. In some implementations, the method 600 provides detection and prediction of a user's cognitive impairment state, for example, related to Autism, PTSD, stroke, and brain injury.

Figure 7:
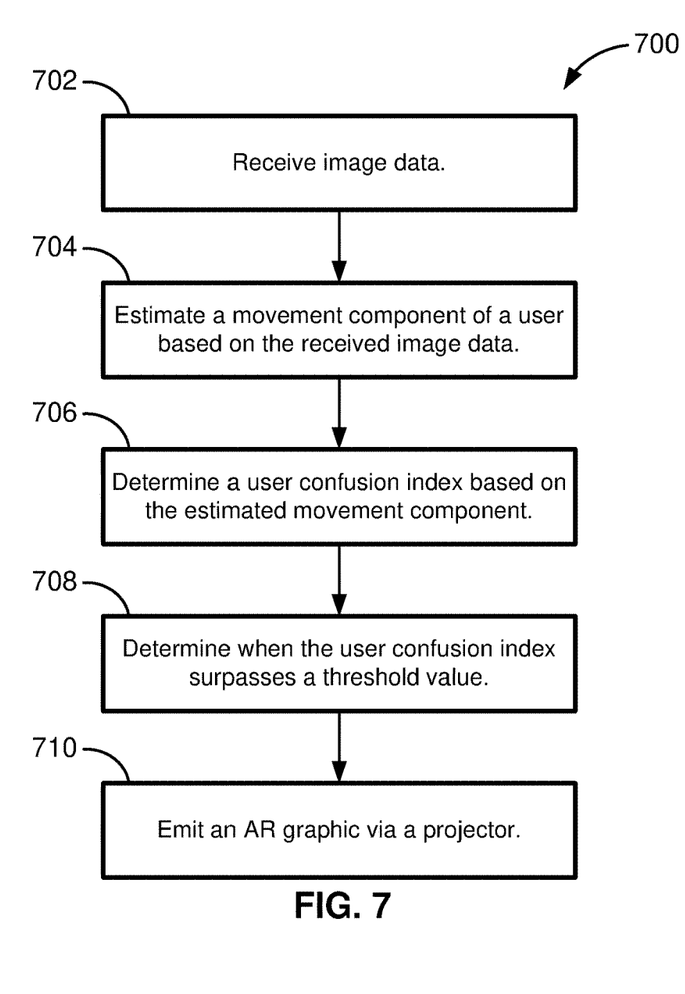
FIG. 7 is a flowchart of a process for displaying a reorientation graphic based on user movement, according to some implementations of the present disclosure.

FIG. 7 is a flowchart of a method 700 for displaying a reorientation graphic based on user movement, according to one embodiment. In some implementations, the method 700 is performed on system 100 of FIG. 1, device 200 of FIGS. 2A-2B, device 300 of FIG. 3, and any combination thereof.

The method 700 provides for receiving image data 702. In some implementations, the image data is received by a camera (e.g., camera 110 of FIG. 1, camera 212 of FIG. 2A-2B, or camera 318 of FIG. 3). In some implementations, additional data is provided by a depth sensor configured to measure a distance of an object, in the field of view of the user, from the housing. In some implementations, audio data and/or motion data are received as well (e.g., from, respectively, microphone 116 and motion sensor 122 of FIG. 1).

The method 700 then provides for estimating a movement component of a user based on the received image data 704. In some implementations, the movement component is determined by processing the received image data to determine whether the received image constitutes a jerky frame or an appropriate field of view. In some implementations, 704 further estimates the movement component based on the received audio data and/or motion data. In some implementations, 704 includes estimating an angular velocity of the head of the user, determining frequency of movements of the head of the user, determining an angular acceleration of the head, and any combination thereof.

In some implementations, 704 provides for determining whether the user is shaking its head, looking around, looking back and forth, or any combination thereof, based on the estimated movement component.

In some implementations, 704 provides for estimating a movement component of the head of the user by identifying an object contained in at least two of the images captured by the camera. 704 further provides for calculating a movement of the object between the at least two images over a period of time. In some implementations, the period of time is predetermined.

The method 700 then provides for determining a user confusion index 706 based on the estimated movement component of step 704. In some implementations, the user confusion index is a numerical score (for example, a score out of 10, 100, or any other range). In some implementations, the user confusion index is determined based on a machine learning algorithm which is trained on input data similar to the data provided by the sensing unit. In some implementations, the user confusion index is a binary value indicating either (1) the user is confused, or (2) the user is not confused. In some implementations, the user confusion index determines a state of the user, for example, whether the user has fallen.

The method 700 then provides for determining whether the user confusion index is greater than a threshold value 708. In some implementations, the threshold value is a predetermined numerical score which indicates an elevated level of confusion, panic, anxiety, or distress of an associated user.

For example, if the user is determined to have fallen in 706, then 708 determines that the user confusion index is greater than a threshold value.

The method 700 then provides for emitting an AR graphic via a projector 710. For example, the AR graphic is displayed via system 100 of FIG. 1, device 200 of FIGS. 2A-2B, device 300 of FIG. 3, or any combination thereof. The AR graphic can be any graphic, as discussed above with respect to FIGS. 5A-5C.

Figure 8:
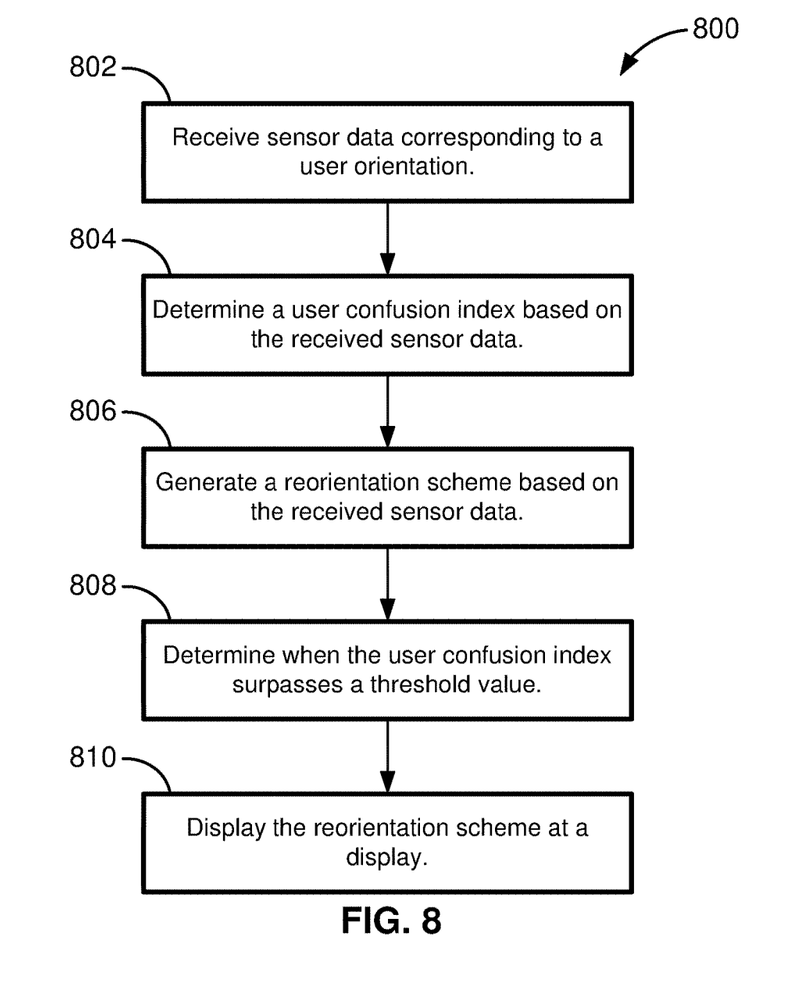
FIG. 8 is a flowchart of a process for generating and displaying a reorientation scheme, according to some implementations of the present disclosure.

FIG. 8 is a flowchart of a method 800 for generating and displaying a reorientation scheme, according to one embodiment. In some implementations, the method 800 is performed on system 100 of FIG. 1, device 200 of FIGS. 2A-2B, and device 300 of FIG. 3.

The method 800 begins by receiving sensor data corresponding to a user orientation 802. In some implementations, the sensor data comes from one of the elements of system 100 (e.g., camera 110, global positioning system (GPS) sensor 112, speaker 114, microphone 116, sensor 118, conductance sensor 120, motion sensor 122, and/or heart rate sensor 124). In some implementations, the sensor data comes from sensor 408 of FIG. 4. The sensor data includes any biometric data of a user or any physical orientation data of a user (e.g., location, whether the user is sitting upright, walking, or has fallen over), as known in the art.

The method 800 then provides for determining a user confusion index based on the received sensor data 804. In some implementations, the user confusion index is a numerical score (for example, a score out of 10, 100, or any other range). In some implementations, the user confusion index is determined based on a machine learning algorithm which is trained on input data similar to the data provided by the sensing unit. In some implementations, the user confusion index is a binary value indicating either (1) the user is confused and/or disoriented, or (2) the user is not confused or disoriented. In some implementations, method 600 further provides for determining what a user is confused about (e.g., is the user confused while walking, is the user confused while talking to another person, is the user confused after taking a phone call).

In some implementations, 804 provides for determining that the user is likely to be disoriented within a predetermined amount of time. For example, the predetermined amount of time is 5 seconds, 10 seconds, 15 seconds, 20 seconds, 30 seconds, 1 minute, 5 minutes, or 10 minutes.

The method 800 then provides for generating a reorientation scheme based on the received sensor data 804. In some implementations, the reorientation scheme is a brain exercise to stimulate the user's brain, a task for the user to complete, a to-do list, or any other activity for the user to complete.

The method 800 provides for determining when the user confusion index surpasses a threshold value 806. In some implementations, the threshold value is a predetermined numerical score which indicates an elevated level of confusion, panic, anxiety, or distress of an associated user. In some implementations of the present disclosure, 806 and 808 can be performed in any order.

The method 800 then provides for displaying the reorientation scheme at a display 810. For example, the reorientation scheme is displayed via system 100 of FIG. 1, device 200 of FIGS. 2A-2B, device 300 of FIG. 3, or any combination thereof. The AR graphic can be any graphic, as discussed above with respect to FIGS. 5A-5C.

In some implementations, the reorientation scheme is representative of an activity performed by the user. For example, the activity was performed by the user within twenty-four hours of displaying the reorientation scheme to the user 810. In some implementations, the activity includes reading a newspaper, eating food, performing a chore, having a conversation, walking, browsing websites, composing emails, writing letters, feeding a pet, or any combination thereof.

In some implementations, a projector emits an AR graphic that is visible to the user and a speaker plays a reorientation audio clip, as discussed further above with respect to 610 of the method 600.

In some implementations, the reorientation scheme is an interactive AR game. For example, a control system, which executes the method 800, provides for detecting input from the user that is responsive to the AR game. The control system is further configured to modify one or more aspects of the interactive augmented reality game that is visible to the user.

In some implementations, the method 800 slows the progression of Alzheimer's for a user by providing reorientation schemes to exercise the user's brain and keep the user engaged. In some implementations, the method 800 tracks dementia progression and diagnosis by providing tasks to the user and checking whether the user has completed the tasks. In some implementations, the method 800 tracks dementia progression and diagnosis by generating a photo of a person known to the user and determining whether the user can identify the person in the photo. In other examples, method 800 repeatedly provides one particular reorientation scheme to a user and determines whether the user is declining in his ability to complete the task.

One or more elements or aspects or steps, or any portion(s) thereof, from one or more of any of the claims below can be combined with one or more elements or aspects or steps, or any portion(s) thereof, from one or more of any of the other claims below, to form one or more additional implementations and/or claims of the present disclosure.

While the present disclosure has been described with reference to one or more particular embodiments and implementations, those skilled in the art will recognize that many changes may be made thereto without departing from the spirit and scope of the present disclosure. Each of these embodiments and implementations and obvious variations thereof is contemplated as falling within the spirit and scope of the present disclosure, which is set forth in the claims that follow.

What is claimed is:

1. A system for aiding a user in overcoming disorientation, the system comprising:
    a housing configured to be coupled to a frame configured to be worn on a head of a user;
    an augmented reality (AR) lens coupled to the housing;
    a projector coupled to the housing and being configured to emit electromagnetic radiation such that the electromagnetic radiation at least partially reflects off the AR lens and is directed towards an eyeball of the user, the electromagnetic radiation being visible to the user as an augmented reality reorientation graphic;
    a memory storing machine-readable instructions; and
    a control system including one or more processors configured to execute the machine-readable instructions to:
        calibrate the projector based on a location of the housing along the frame;
        determine a user confusion index; and
        cause the projector to emit the electromagnetic radiation such that the augmented reality reorientation graphic is visible to the user when the determined user confusion index satisfies a predetermined threshold.

2. The system of claim 1, further comprising a camera coupled to the housing and being configured to generate image data.

3. The system of claim 2, wherein the control system is further configured to estimate a movement component of the head of the user based at least in part on the generated image data, and wherein the determination of the user confusion index is based at least in part on the estimated movement component.

4. The system of claim 1, further comprising a motion sensor coupled to the housing and being configured to generate motion data, the motion data being indicative of movement of the head of the user.

5. The system of claim 4, wherein the determination of the user confusion index is based at least in part on the generated motion data.

6. The system of claim 4, wherein the determining the user confusion index includes estimating a movement component of the head of the user based at least in part on the generated motion data.

7. The system of claim 6, wherein the estimating the movement component of the head of the user includes estimating an angular velocity of the head, a frequency of movements of the head, an angular acceleration of the head, or any combination thereof.

8. The system of claim 6, wherein the movement component of the head of the user is indicative that the user is shaking its head, looking around, looking back and forth, or any combination thereof.

9. The system of claim 4, wherein the determining the user confusion index includes estimating a walking movement of the user based at least in part on the generated motion data.

10. The system of claim 4, wherein the motion sensor is a gyroscope or accelerometer.

11. The system of claim 1, wherein the housing is removable from the frame without the use of tools.

12. The system of claim 1, wherein the housing is permanently coupled to the frame.

13. The system of claim 1, wherein the augmented reality reorientation graphic includes (i) text based information that is indicative of a current mission of the user, (ii) text based information that is indicative of a reminder for the user to take a specific medication at a specific time, (iii) augmented reality directions, (iv) a current day of week, a current year, a current time of day, a current season, or any combination thereof, (v) current event information, (vi) a representation of a portion of a newspaper previously viewed by the user, (vii) social media news feed information previously viewed by the user, (viii) a representation of a portion of a website previously viewed by the user, (ix) information identifying a human in the field of view of the user by name, (x) identity information associated with the user, the identity information including a name of the user, a home address of the user, a name of a user's spouse, or any combination thereof, (xi) or any combination of (i)-(x).

14. The system of claim 1, further comprising:
a camera coupled to the housing and being configured to generate image data; and
a motion sensor coupled to the housing and being configured to generate motion data,
wherein the control system is further configured to estimate a movement component of the head of the user based at least in part on the generated image data and based at least in part on the generated motion data.

15. The system of claim 14, wherein the determination of the user confusion index is based at least in part on the estimated movement component.

16. The system of claim 1, further comprising a heart rate sensor coupled to the housing and being configured to generate heart rate data.

17. The system of claim 16, wherein the determination of the user confusion index is based at least in part on the generated heart rate data.

18. The system of claim 16, wherein the heart rate data is indicative of a heart rate of the user, a variability of heart rate of the user between breathing in and breathing out, or both.

19. The system of claim 1, further comprising a skin conductance sensor coupled to the housing and being configured to generate skin conductance data, wherein the determination of the user confusion index is based at least in part on the generated skin conductance data.

* * * * *